US009964841B2

(12) United States Patent
Suzuki (10) Patent No.: US 9,964,841 B2
(45) Date of Patent: May 8, 2018

(54) LIGHT SOURCE DEVICE, PROJECTION DISPLAY DEVICE, AND LIGHT SOURCE CONTROL METHOD

(71) Applicant: NEC Display Solutions, Ltd., Tokyo (JP)

(72) Inventor: Kenji Suzuki, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days. days.

(21) Appl. No.: 15/547,459

(22) PCT Filed: Apr. 3, 2015

(86) PCT No.: PCT/JP2015/060621
§ 371 (c)(1),
(2) Date: Jul. 28, 2017

(87) PCT Pub. No.: WO2016/157522
PCT Pub. Date: Oct. 6, 2016

(65) Prior Publication Data
US 2018/0039168 A1 Feb. 8, 2018

(51) Int. Cl.
*G03B 21/14* (2006.01)
*H04N 9/31* (2006.01)
(Continued)

(52) U.S. Cl.
CPC ....... *G03B 21/2033* (2013.01); *G03B 21/005* (2013.01); *G03B 21/147* (2013.01);
(Continued)

(58) Field of Classification Search
CPC .............. G03B 21/204; G03B 21/2053; G03B 21/005; G03B 21/006; G03B 21/008;
(Continued)

(56) References Cited

U.S. PATENT DOCUMENTS 9,300,929 B2 * 3/2016 Kashiwagi ............. G02B 7/006
9,500,940 B2 * 11/2016 Hung .................. G03B 21/2053
(Continued)

FOREIGN PATENT DOCUMENTS

JP    2011-117989 A    6/2011
JP    2012-027106 A    2/2012
(Continued)

OTHER PUBLICATIONS

International Search Report (ISR) (PCT Form PCT/ISA/210), in PCT/JP2015/060621, dated Jun. 9, 2015.

*Primary Examiner* — William C Dowling
(74) *Attorney, Agent, or Firm* — McGinn IP Law Group, PLLC (57) ABSTRACT

A light source device includes: a phosphor rotating body on which a phosphor that is formed on a surface and that is used in a rotating state with an axis of rotation that is perpendicular to the surface; a first excitation light source that generates first fluorescent light by irradiating first excitation light upon a first position that is separated from the center of rotation on the surface; a detection light generation unit that irradiates detection light upon a second position that is separated from the center of rotation on the surface and that differs from the first position; an optical detection unit that supplies a detection signal corresponding to emission light emitted from the phosphor rotating body in response to the detection light; and a control unit that receives the detection signal and controls the intensity of the first excitation light on the basis of the detection signal.

14 Claims, 9 Drawing Sheets

(51) Int. Cl.
*G03B 21/20* (2006.01)
*G03B 21/00* (2006.01)

(52) U.S. Cl.
CPC ....... *G03B 21/204* (2013.01); *G03B 21/2046* (2013.01); *G03B 21/2053* (2013.01); *G03B 21/2066* (2013.01)

(58) Field of Classification Search
CPC ........ G03B 21/14; H04N 9/31; H04N 9/3102; H04N 9/3111; H04N 9/3114; H04N 9/3194
See application file for complete search history.

(56) References Cited

U.S. PATENT DOCUMENTS

| | | | |
|---|---|---|---|
| 9,681,110 B2* | 6/2017 | Miyazaki | H04N 9/3111 |
| 2016/0320692 A1* | 11/2016 | Takahashi | G03B 21/142 |
| 2017/0094751 A1* | 3/2017 | Suzuki | H05B 37/0227 |

FOREIGN PATENT DOCUMENTS

| | | |
|---|---|---|
| JP | 2012-155004 A | 8/2012 |
| JP | 2012-235295 A | 11/2012 |
| JP | 2014-062974 A | 4/2014 |
| JP | 2015-031876 A | 2/2015 |

* cited by examiner

LIGHT SOURCE DEVICE, PROJECTION DISPLAY DEVICE, AND LIGHT SOURCE CONTROL METHOD

TECHNICAL FIELD

The present invention relates to a light source device that employs a phosphor wheel, a projection-type display device, and a light source control method.

BACKGROUND ART

Light source devices that use a phosphor are known as light source devices for projectors. This type of light source device has a phosphor wheel and an excitation light source that irradiates excitation light upon the phosphor wheel.

The phosphor wheel includes a wheel, and a phosphor layer that is formed on the wheel surface and that contains a phosphor that emits fluorescent light in response to excitation light. The phosphor wheel is configured such that the wheel rotates at a fixed speed with the center of the wheel surface as the center of rotation. The phosphor layer may be formed by applying a phosphor directly to the wheel surface, or may be formed by adhering a sheet to which a phosphor has been applied to the wheel surface.

A drive current that is supplied to the excitation light source is controlled such that the intensity of the excitation light is uniform. However, because the thickness of the phosphor layer or the concentration of the phosphor may vary according to the position on the phosphor wheel, the intensity of the fluorescent light will vary according to the position of irradiation of excitation light on the phosphor wheel even when the intensity of the excitation light is uniform. As a result, when excitation light is irradiated upon a phosphor wheel that rotates at a fixed speed, the intensity of the fluorescent light changes cyclically, and this cyclical change in the intensity of the fluorescent light may give rise to a phenomenon known as "flicker" that is perceptible to the human eye as flashing light. This same flicker may occur due to damage to the phosphor layer or to gaps in the joining seams of a sheet.

A light source device that can prevent the above-described flicker is disclosed in Patent Document 1. In this light source device, a light sensor that detects fluorescent light is arranged in the vicinity of a collimator lens that converts the fluorescent light emitted by the phosphor wheel to parallel luminous flux. The light sensor converts the fluorescent light to an electrical signal, and this output signal is proportional to the intensity of the fluorescent light. On the basis of the output signal of this light sensor, the drive current that is supplied to the excitation light source is controlled such that the intensity of the fluorescent light becomes uniform.

RELATED ART DOCUMENTS

Patent Documents

Japanese Patent Application Publication No. 2012-155004

DISCLOSURE OF THE INVENTION

However, in the light source device disclosed in Patent Document 1, since the light sensor is arranged in the vicinity of the collimator lens, a portion of the fluorescent light that passes through the collimator lens is blocked by the light sensor, and as a result, the problem arises that the intensity of the illumination light is decreased.

An example object of the present invention is to provide a light source device, a projection-type display device, and a light source control method that can prevent flicker without decreasing the intensity of the illumination light and thus solve the above-described problems.

To achieve the above-described object, according to an example aspect of the present invention, a light source device is provided that includes:

a phosphor rotating body on which a phosphor formed on a surface and that is used in a state of rotation having an axis of rotation that is perpendicular to the surface;

a first excitation light source that irradiates first excitation light upon a first position that is separated by a predetermined distance from the center of rotation on the surface to cause emission of a first fluorescent light;

a detection light generation unit that irradiates detection light upon a second position that differs from the first position and that is separated by the predetermined distance from the center of rotation on the surface;

an optical detection unit that supplies a detection signal that corresponds to emission light that is emitted from the phosphor rotating body in response to the detection light; and a control unit that receives the detection signal and that controls the intensity of the first excitation light on the basis of the detection signal.

According to another aspect of the present invention, a projection-type display device is provided that includes:

the above-described light source device;

a display element that modulates light that is supplied by the light source device to form an image; and a projection optical system that projects the image formed by the display element.

According to yet another aspect of the present invention, a light source control method is provided that includes:

causing a phosphor rotating body on which a phosphor is formed on a surface to rotate;

causing excitation light to irradiate a first position that is separated by a predetermined distance from the center of rotation on the surface to cause emission of fluorescent light;

irradiating detection light upon a second position that differs from the first position and that is separated by the predetermined distance from the center of rotation on the surface and detecting the emission light that is emitted from the phosphor rotating body in response to the detection light; and controlling the intensity of the excitation light on the basis of the detection result of the emission light.

EXAMPLE EMBODIMENTS

Example embodiments of the present invention are next described with reference to the accompanying drawings.

First Example Embodiment

Figure 1:
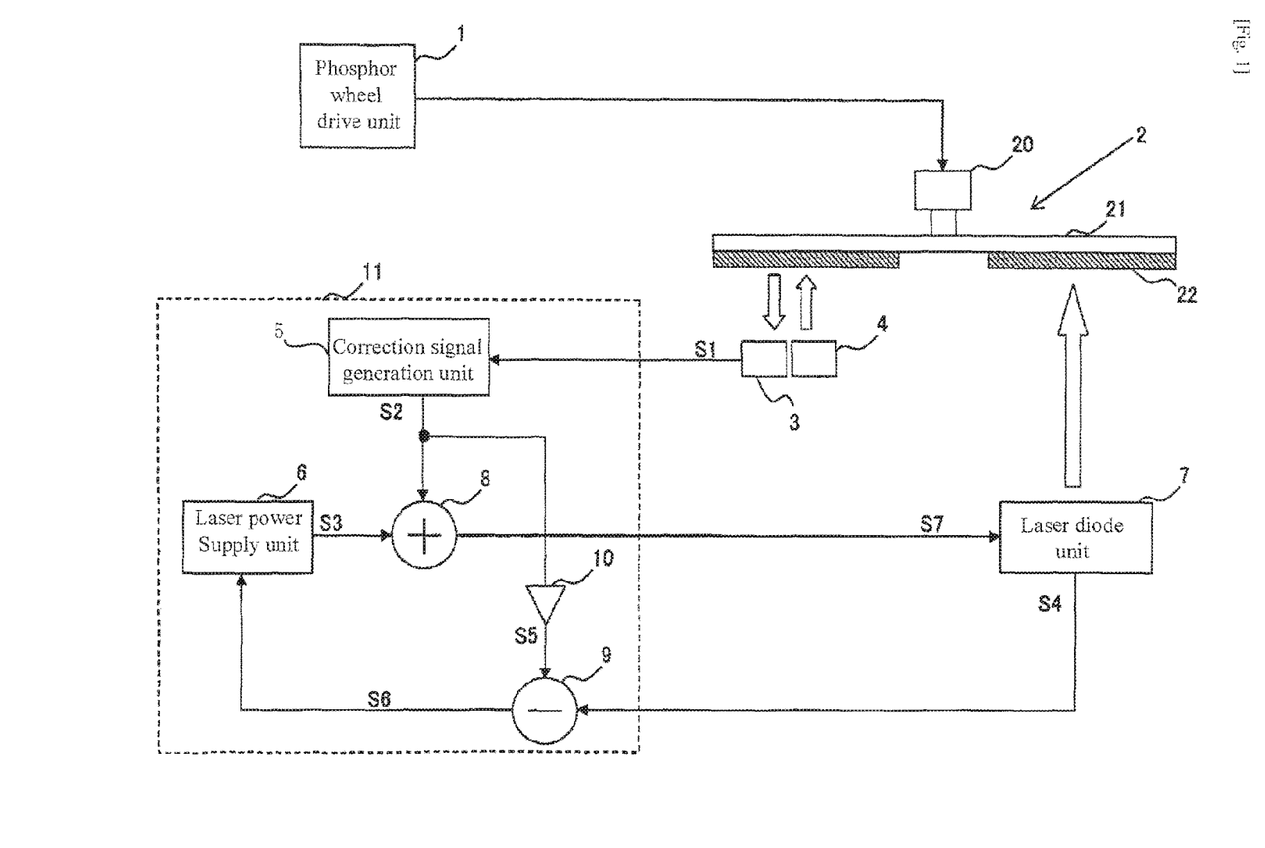
FIG. 1 is a block diagram showing the configuration of the light source device according to the first example embodiment of the present invention.

FIG. 1 is a block diagram showing the configuration of the light source device according to the first example embodiment of the present invention.

Referring to FIG. 1, the light source device includes phosphor wheel drive unit 1, phosphor wheel unit 2, optical detection unit 3, detection light generation unit 4, laser diode unit 7, and drive signal supply unit 11. Drive signal supply unit 11 includes correction signal generation unit 5, laser power supply unit 6, addition unit 8, subtraction unit 9, and amplifier 10.

Phosphor wheel unit 2 includes disc-shaped wheel 21, phosphor layer 22 that includes a phosphor that emits fluorescent light in response to excitation light and that is provided on the surface of the wheel, and motor unit 20 that rotates wheel 21 with an axis of rotation that is perpendicular to the wheel surface. Phosphor layer 22 may be formed by applying a phosphor directly to the wheel surface, or may be formed by adhering to the wheel surface a sheet to which a phosphor has been applied. In the latter case, a plurality of sheets that correspond to the wheel shape are cut out from a single sheet and this plurality of sheets then is adhered to the wheel surface. As a result, gaps may occur between the sheets. Wheel 21 is an example of the phosphor rotating body.

Phosphor wheel drive unit 1 drives motor unit 20 of phosphor wheel unit 2. More specifically, phosphor wheel drive unit 1 drives motor unit 20 such that wheel 21 rotates at a predetermined speed, such as a fixed speed.

Laser diode unit 7 is the excitation light source, and for example, is made up of a blue laser diode. The excitation light (first excitation light) supplied from laser diode unit 7 is irradiated upon the surface of phosphor wheel unit 2 on which phosphor layer 22 is formed by way of an optical system that includes, for example, lenses and mirrors. Laser diode unit 7 is configured such that laser diode is driven by a current and supplies feedback signal S4 for supplying a first excitation light having a desired intensity to drive signal supply unit 11. Feedback signal S4 is a signal that accords with the intensity of the first excitation light. The configuration of the current drive of the laser diode is well known and the details of this configuration are therefore here omitted.

Detection light generation unit 4 includes a detection light generating light source that produces the detection light (for example, a laser diode that is the excitation light source) and a power source unit that supplies a drive current to this detection light generating light source. Because it is here assumed that detection light is used to cause generation of fluorescent light by phosphor layer 22, the detection light generating light source supplies excitation light (second excitation light) similar to laser diode unit 7. The drive current that is supplied to the detection light generating light source is controlled such that the intensity of the second excitation light is fixed. The intensity of the second excitation light is preferably lower than the intensity of the first excitation light that is supplied by laser diode unit 7. The wavelength of the second excitation light is preferably equal or substantially equal to the wavelength of the first excitation light, but the present invention is not limited to this form. The wavelength of the second excitation light may differ from the wavelength of the first excitation light.

The second excitation light is condensed on phosphor layer 22 by way of an optical system that includes, for example, lenses. Phosphor layer 22 emits second fluorescent light by means of the second excitation light. The spot of the second excitation light on phosphor layer 22 is formed at a position that differs from the spot of the first excitation light that is supplied by laser diode unit 7. The spot diameter of the second excitation light is preferably equal to or substantially equal to the spot diameter of the first excitation light, but the present invention is not limited to this form.

Figure 2:
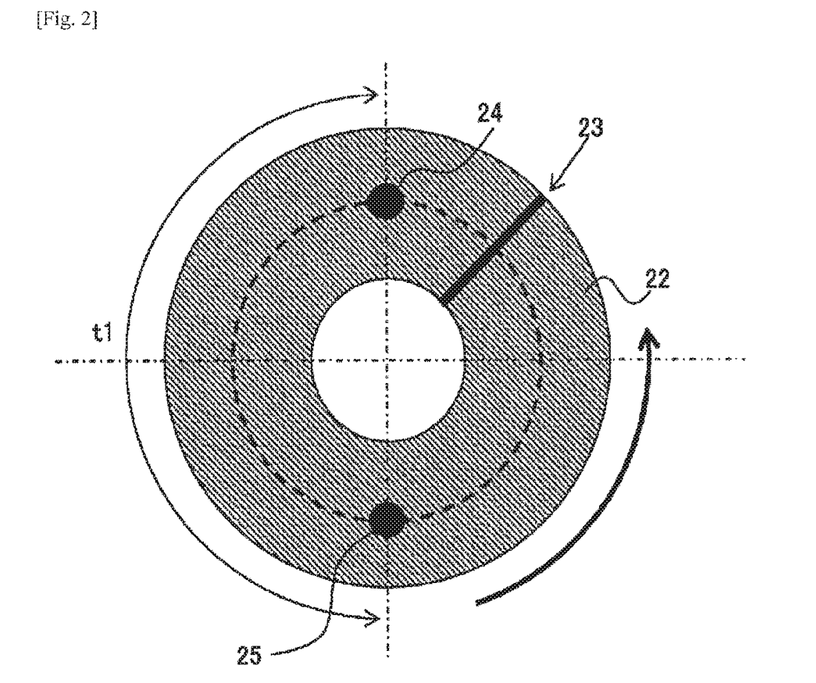
FIG. 2 is a schematic view for describing the positional relation of the spot of the first excitation light and the spot of the second excitation light.

FIG. 2 gives a schematic representation of the positional relation between the spot of the first excitation light and the spot of the second excitation light. As shown in FIG. 2, spot 24 of the first excitation light and spot 25 of the second excitation light are located on the same circle (the circle indicated by the broken line) that takes the center of rotation as its center. When wheel 22 is caused to rotate, the track of spot 24 of the first excitation light coincides with the track of spot 25 of the second excitation light. In the example of FIG. 2, spot 25 of the second excitation light is located on the side opposite spot 24 of the first excitation light with the center of rotation interposed, but the present invention is not limited to this form. Spot 25 of the second excitation light may be formed at any position on the track of spot 24 of the first excitation light as long as optical detection unit 3 and detection light generation unit 4 do not interfere with the optical system such as lenses that condense the first excitation light.

The intensity of first fluorescent light is determined by the intensity of the first excitation light and the thickness and phosphor concentration of phosphor layer 22. When the intensity of first excitation light changes, the intensity of the first fluorescent light also changes according to this change in intensity. Further, if the thickness of phosphor layer 22 or the concentration of the phosphor changes or if there is damage in phosphor layer 22 in the irradiation region (track) of the first excitation light, the intensity of the first fluorescent light also changes according to the thickness, concentration, or damage. Still further, when there is gap 23 at a seam, the intensity of first fluorescent light decreases in the vicinity of the seam. The circumferential size of gap 23 is sufficiently smaller than the size of spot 24 of the first excitation light or spot 25 of the second excitation light.

As in the above explanation, the intensity of the second fluorescent light is determined by the intensity of the second excitation light and the thickness and phosphor concentration of phosphor layer 22. Here, the intensity of second excitation light is uniform. When the thickness of phosphor layer 22 or the concentration of the phosphor changes or when there is damage to phosphor layer 22 in the irradiation region (track) of the second excitation light, the intensity of the second fluorescent light changes in accordance with the thickness, concentration, or damage. Further, when gap 23 of a seam occurs, the intensity of the second fluorescent light decreases in the vicinity of the seam. The irradiation region (track) of the second excitation light coincides with the irradiation region (track) of the first excitation light, and the pattern of change in the intensity of the second fluorescent light that arises due to gaps 23 and the thickness, concentration, and damage of phosphor layer 22 therefore relatively coincides with the pattern of change in intensity of the first fluorescent light that arises due to gaps 23 and the thickness, concentration, and damage of phosphor layer 22.

Optical detection unit 3 supplies to drive signal supply unit 11 detection signal S1 in which the second fluorescent light that was produced by the second excitation light is converted to an electric signal. The second fluorescent light is emission light that is emitted from wheel 21 that is provided with phosphor layer 22 in response to detection light. Detection signal S1 is a signal that is proportional to the intensity of the second fluorescent light. For example, when the thickness of phosphor layer 22 or the concentration of the phosphor changes, detection signal S1 becomes a change signal that includes the change component. In particular, detection signal S1 is a signal that accords with the cyclical change in intensity of the second fluorescent light when wheel 21 rotates. Detection signal S1 is supplied to correction signal generation unit 5.

Drive signal supply unit 11 is a control unit that changes the intensity of the first excitation light based on detection signal S1 from optical detection unit 3. Drive signal supply unit 11 causes the intensity of the first excitation light to change by changing the magnitude of the drive current of laser diode unit 7.

The actual operation of drive signal supply unit 11 is next described.

Figure 3:
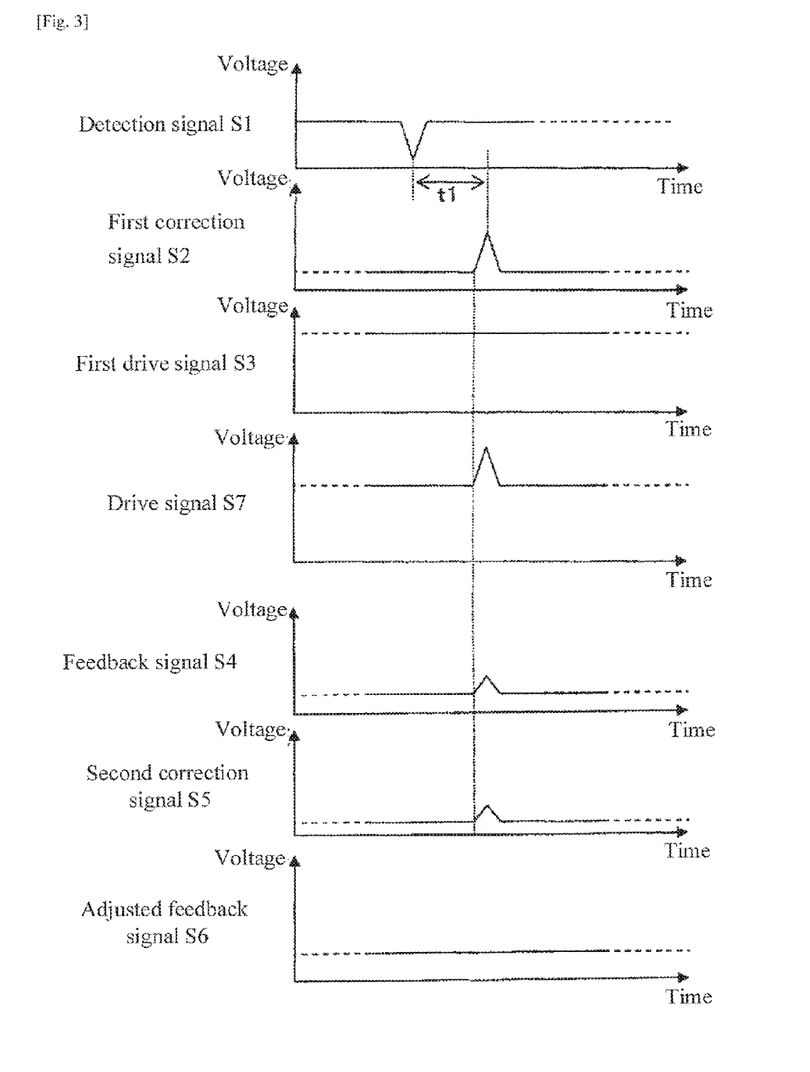
FIG. 3 is a waveform diagram for describing the operation of the drive signal supply unit of the light source device shown in FIG. 1.

FIG. 3 is a waveform diagram for describing the operation of drive signal supply unit 11. In FIG. 3, signal waveforms are shown schematically for the sake of convenience, and the actual signal waveforms differ. The following explanation refers to FIGS. 1-3.

Laser power supply unit 6 supplies first drive signal S3 according to the magnitude of adjusted feedback signal S6 that was supplied by subtraction unit 9.

Based on detection signal S1 from optical detection unit 3, correction signal generation unit 5 generates first correction signal S2 that cancels the change in intensity of the first fluorescent light that arises due to gap 23, change of the thickness and concentration, or damage of phosphor layer 22. More specifically, correction signal generation unit 5 generates first correction signal S2 by inversely amplifying detection signal S1 and then delaying the obtained signal by delay time t1 that is shown in FIG. 2. First correction signal S2 is supplied to addition unit 8 and amplifier 10.

Delay time t1 is determined based on the positional relation between spot 24 of the first excitation light and spot 25 of the second excitation light (for example, the angle formed by the line that joins the center of spot 24 and the center of rotation and the line that joins the center of spot 25 and the center of rotation), the rotation rate, and the rotation direction of wheel 21. In the case of a positional relation in which spot 25 of the second excitation light is located on the side opposite spot 24 of the first excitation light with the center of rotation interposed, the direction of rotation need not be considered. By delaying detection signal S1 by delay time t1, the delay time of the change in intensity of the second fluorescent light with respect to the change in intensity of the first fluorescent light can be corrected.

Addition unit 8 superposes first correction signal S2 that was supplied by correction signal generation unit 5 upon first drive signal S3 that was supplied by laser power supply unit 6. The signal produced by superposing first correction signal S2 upon first drive signal S3 is drive signal S7. Drive signal S7 is supplied to laser diode unit 7.

Laser diode unit 7 both drives a laser diode on the basis of drive signal S7 and supplies feedback signal S4 to drive signal supply unit 11. Feedback signal S4 contains a change component that corresponds to first correction signal S2 that was superposed on first drive signal S3. Feedback signal S4 is supplied to one input of subtraction unit 9.

Amplifier 10 adjusts the level of first correction signal S2 to a predetermined level and supplies the signal that follows this adjustment as output second correction signal S5. More specifically, amplifier 10 decreases the level of first correction signal S2 by an amount that is equivalent to the known gain portion that is determined in the stage of generating feedback signal S4 of laser diode unit 7. Second correction signal S5 that is supplied by amplifier 10 is supplied to the other input of subtraction unit 9. Second correction signal S5 is a signal that corresponds to the above-described change component that is contained in feedback signal S4.

Subtraction unit 9 subtracts second correction signal S5 that was supplied by amplifier 10 from feedback signal S4 that was supplied by laser diode unit 7, whereby the above-described change component contained in feedback signal S4 is eliminated. The signal from which the above-described change component has been eliminated is supplied to laser power supply unit 6 as adjusted feedback signal S6.

According to the light source device of the present example embodiment described hereinabove, the following action and effects are exhibited.

When the intensity of excitation light is uniform, the fluorescent light intensity and thickness of phosphor layer 22 are in a substantially proportional relation. When the thickness of phosphor layer 22 is uniform, the excitation light intensity and fluorescent light intensity are in a substantially proportional relation. The present example embodiment takes advantage of these relations.

As shown in FIG. 2, the track of the second excitation light when wheel 21 is rotated coincides with the track of the first excitation light, whereby changes in the intensity of the second fluorescent light that arise due to gaps 23, damage, or changes in the thickness and concentration of phosphor layer 22 relatively coincide with the change in the intensity of the first fluorescent light. As a result, detection signal S1 that indicates changes in intensity of the second fluorescent light relatively coincide with the pattern of change in intensity of the first fluorescent light, and, based on this detection signal S1, a pattern of the changes in intensity of the first excitation light can be obtained for canceling changes in the intensity of the first fluorescent light.

Correction signal generation unit 5 generates first correction signal S2 in which detection signal S1 is inversely amplified, whereby first correction signal S2 corresponds to a waveform that is the inverse of the pattern of change in intensity of the first fluorescent light. As a result, by operating laser diode unit 7 by drive signal S7 in which first correction signal S2 is superposed upon first drive signal S3, change in the intensity of the first excitation light cancels out change in intensity of the first fluorescent light, whereby the occurrence of flicker is prevented.

As shown in FIG. 2, spot 25 of the second excitation light is formed at a position that is separated from spot 24 of the first excitation light, whereby optical detection unit 3 and detection light generation unit 4 do not block the first fluorescent light, and further, do not interfere with the optical system such as lenses that condense the first excitation light.

In addition, the intensity of the first fluorescent light may change when wheel 21 is rotated due to changes over the passage of time of phosphor layer 22 (such as deterioration of the phosphor or the occurrence of gaps at seams). In such cases as well, change in the intensity of the first excitation light cancels out change in intensity of the first fluorescent light by operating laser diode unit 7 by drive signal S7 in which first correction signal S2 is superposed upon first drive signal S3, whereby the occurrence of flicker is prevented.

Further, the intensity of the second excitation light is sufficiently lower than the intensity of the first excitation light, whereby deterioration of the phosphor due to the second excitation light can be prevented.

In the light source device of the present example embodiment, correction signal generation unit 5 may continuously generate first correction signal S2 on the basis of detection signal S1 during operation of the light source device. Alternatively, correction signal generation unit 5 may generate a waveform pattern of first correction signal S2 of one rotation of wheel 21 (one-cycle portion) at every predetermined interval or at any timing and then both hold this waveform pattern and supply first correction signal S2 that is based on the held waveform pattern.

Second Example Embodiment

Figure 4:
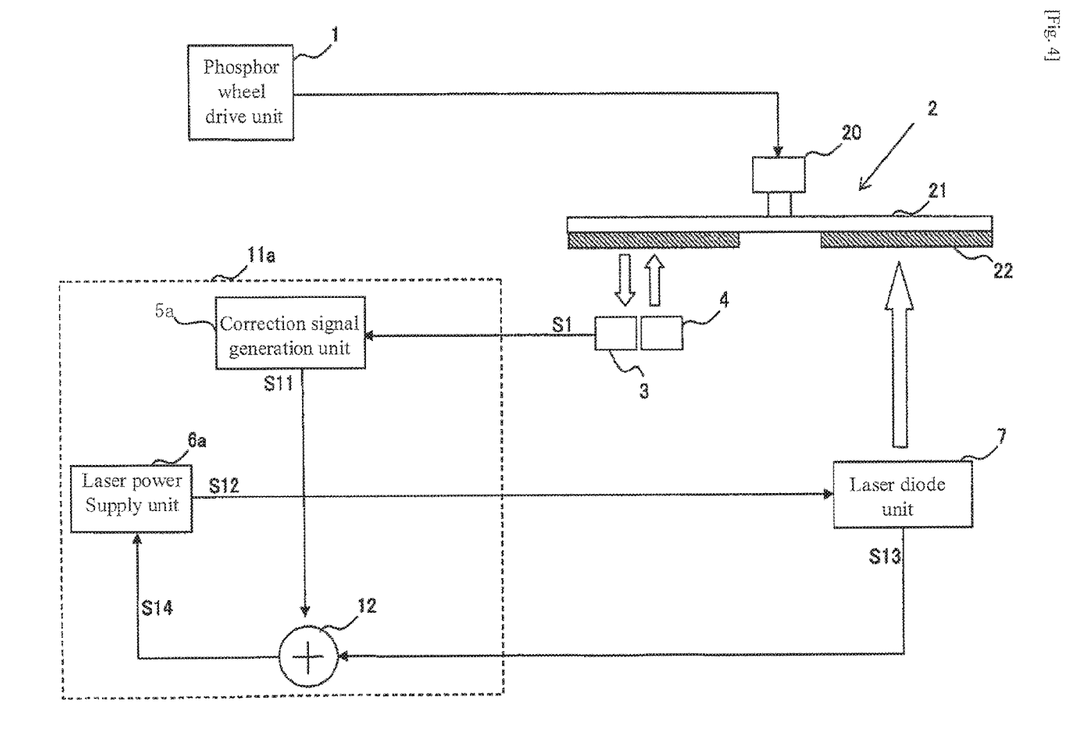
FIG. 4 is a block diagram showing the configuration of the light source device according to the second example embodiment of the present invention.

FIG. 4 is a block diagram showing the configuration of the light source device according to the second example embodiment of the present invention.

The light source device shown in FIG. 4 is of the same configuration as the light source device of the first example embodiment with the exception that the configuration of drive signal supply unit 11a differs. To avoid redundant explanation, explanation of configuration that is identical to configuration of the light source device of the first example embodiment will be omitted.

Drive signal supply unit 11a is a control unit that causes change of the intensity of the first excitation light based on detection signal S1 from optical detection unit 3. Drive signal supply unit 11a brings about change of the intensity of the first excitation light by changing the magnitude of the drive current of laser diode unit 7.

Drive signal supply unit 11a includes correction signal generation unit 5a, laser power supply unit 6a, and addition unit 12. The operation of each part of drive signal supply unit 11a is next described more specifically.

Figure 5:
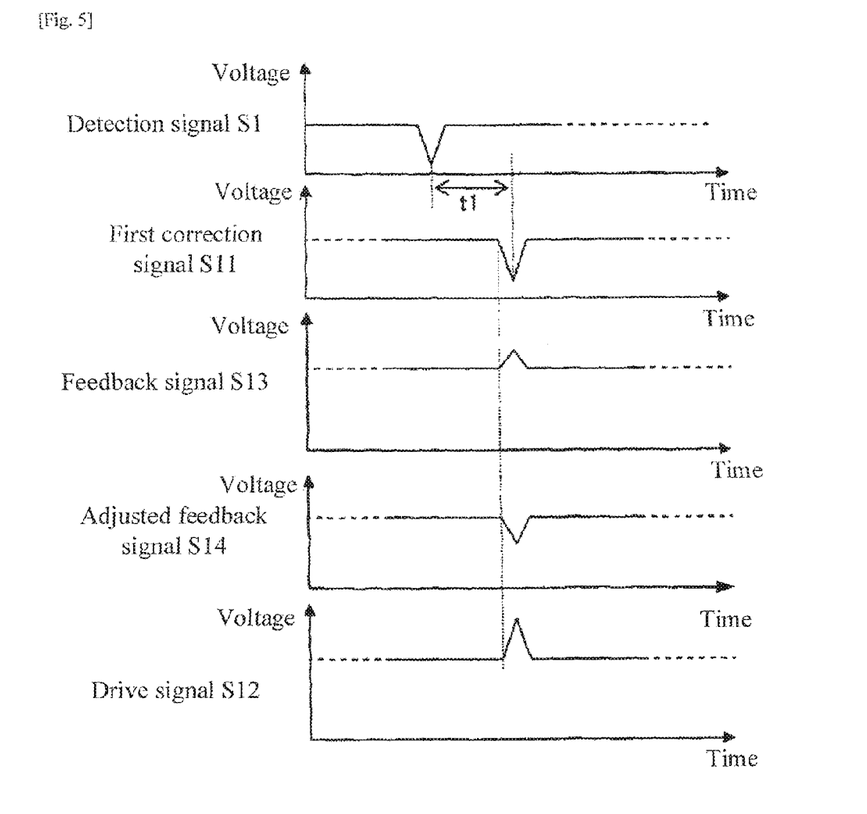
FIG. 5 is a waveform diagram for describing the operation of the drive signal supply unit of the light source device shown in FIG. 4.

FIG. 5 is a waveform diagram for describing the operation of drive signal supply unit 11a. In FIG. 5, the signal waveforms are shown schematically for the sake of convenience and are different from the actual signal waveforms. In the following explanation, reference is made to FIGS. 4 and 5.

Correction signal generation unit 5a generates first correction signal S11 in which detection signal S1 from optical detection unit 3 has been amplified. More specifically, correction signal generation unit 5a generates first correction signal S11 by amplifying detection signal S1 and then delaying the realized signal by delay time t1 shown in FIG. 2. First correction signal S11 actually corresponds to a signal that is twice the feedback amount of the desired change of the laser diode current (a signal realized by adding the feedback cancelling amount to the actual correction amount). First correction signal S11 is supplied to one input of addition unit 12.

Addition unit 12 superposes first correction signal S11 that was supplied by correction signal generation unit 5a upon feedback signal S13 that was supplied by laser diode unit 7. The signal realized by superposing first correction signal S11 upon feedback signal S13 is supplied to laser power supply unit 6a as adjusted feedback signal S14.

Laser power supply unit 6a supplies drive signal S12 that accords with the magnitude of adjusted feedback signal S14 that was supplied from addition unit 12 to laser diode unit 7.

Laser diode unit 7 both drives the laser diode based on drive signal S12 and supplies feedback signal S13 to drive signal supply unit 11a. Feedback signal S13 contains a change component that corresponds to first correction signal S11. A portion of the change component is eliminated by superposing first correction signal S11 upon feedback signal S13 in addition unit 12.

The light source device of the present example embodiment also exhibits the same action and effects as the first example embodiment.

Third Example Embodiment

Figure 6:
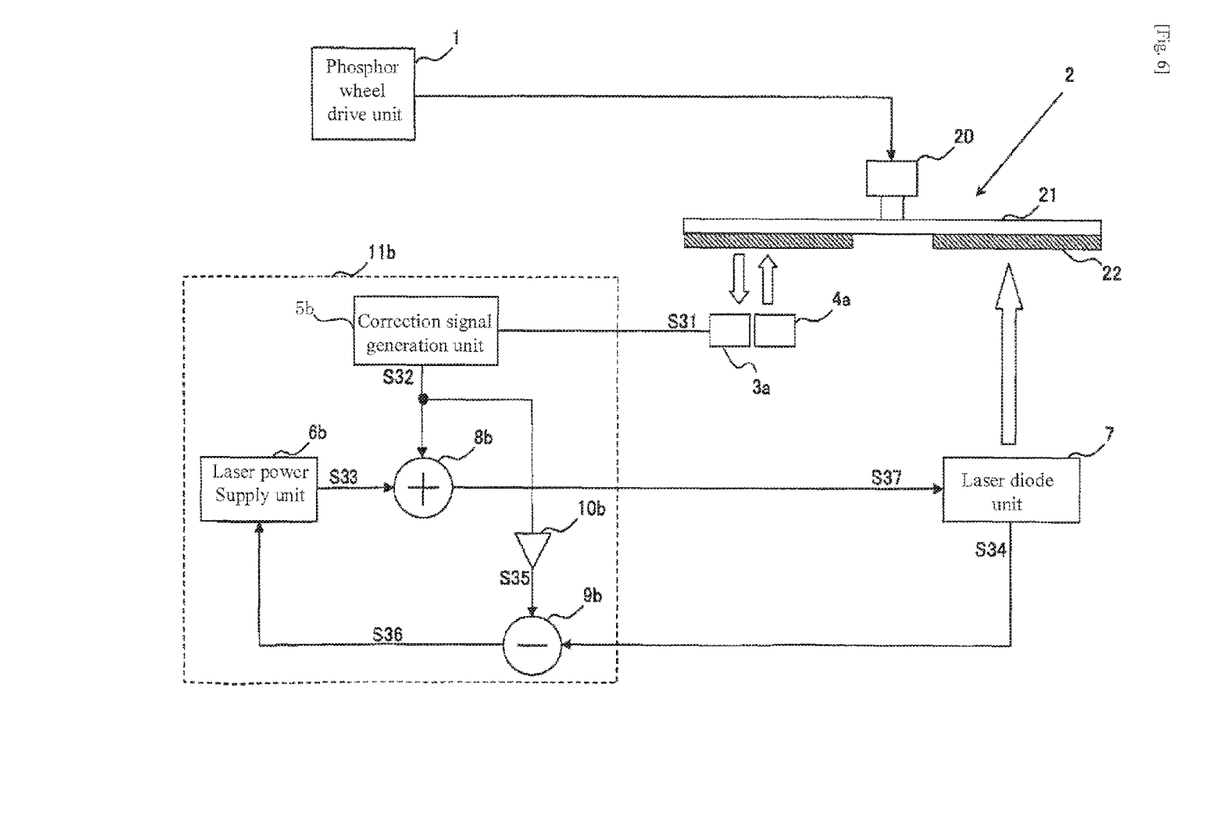
FIG. 6 is a block diagram showing the configuration of the light source device according to the third example embodiment of the present invention.

FIG. 6 is a block diagram showing the configuration of the light source device according to the third example embodiment of the present invention.

The light source device shown in FIG. 6 is of the same configuration as that of the first example embodiment with the exception that drive signal supply unit 11b, detection light generation unit 4a, and optical detection unit 3a differ from the first example embodiment. To avoid redundant explanation, configuration that is identical to the light source device of the first example embodiment is here omitted.

Detection light generation unit 4a supplies detection light having an energy (or wavelength) that does not produce fluorescent light, such as infrared light. The intensity of the detection light is of a predetermined intensity (fixed intensity). The detection light is reflected by the surface (wheel surface) on which phosphor layer 22 is formed of wheel 21.

Optical detection unit 3a supplies detection signal S31 obtained by converting the reflected light of the detection light from the wheel surface to an electric signal to drive signal supply unit 11b. The reflected light of the detection light is emission light that is emitted from wheel 21 that is provided with phosphor layer 22 in response to the detection light. Detection signal S31 is a signal that is proportional to the intensity of the reflected light of the detection light. For example, when there is damage or gap 23 of a seam of phosphor layer 22, the intensity of the reflected light of the detection light decreases in the portion of the damage or gap 23 when wheel 21 is rotated. Detection signal S31 is a signal that changes in accordance with this change in intensity of the reflected light.

Figure 7:
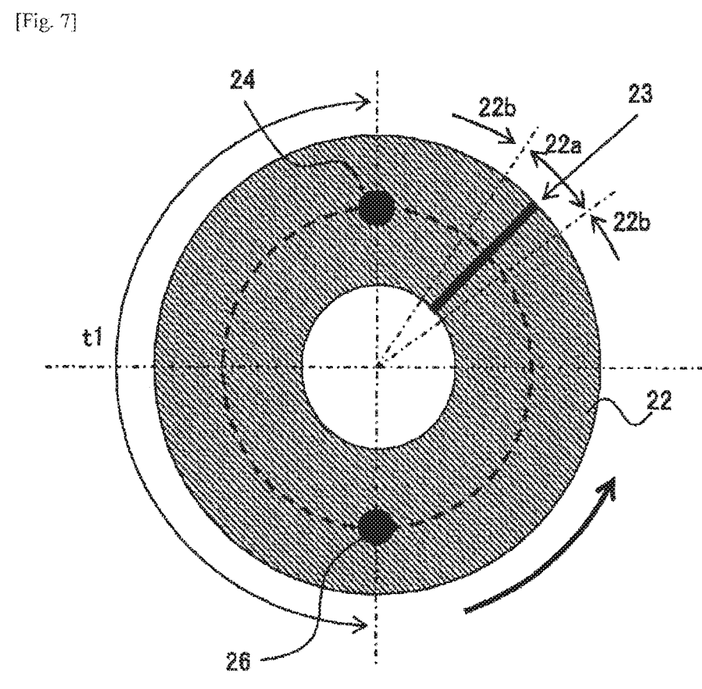
FIG. 7 is a schematic view for describing the positional relation of the spot of the first excitation light and the spot of the detection light.

FIG. 7 gives a schematic representation of the positional relation between spot 24 of the first excitation light supplied by laser diode unit 7 and spot 26 of the detection light supplied by detection light generation unit 4a. As shown in FIG. 7, spot 24 of the first excitation light and spot 26 of the detection light are positioned on the same circle (the circle indicated by the broken line) that takes the center of rotation as its center. The track of spot 24 of the first excitation light when wheel 22 is rotated coincides with the track of spot 26 of the detection light. In the example of FIG. 7, spot 26 of the detection light is positioned on the opposite side of spot 24 of the first excitation light with the center of rotation interposed, but the present invention is not limited to this positional relation. Spot 26 of the detection light may be formed at any position on the track of spot 24 of the first excitation light as long as optical detection unit 3 and detection light generation unit 4 do not interfere with the optical system such as lenses that condenses the first excitation light.

Drive signal supply unit 11b is a control unit that changes the intensity of the first excitation light on the basis of detection signal S31 from optical detection unit 3a. Drive signal supply unit 11b changes the intensity of the first excitation light by changing the magnitude of the drive current of laser diode unit 7. For example, when there is gap 23 of a seam of phosphor layer 22, drive signal supply unit 11b raises the intensity of the first excitation light in the interval in which spot 24 of the first excitation light passes region 22a that includes gap 23. Here, region 22a includes the region that corresponds to the size of spot 24 of the first excitation light before and after gap 23 in the direction of rotation. Alternatively, drive signal supply unit 11b may decrease the intensity of the first excitation light in, instead of the interval of passage of region 22a, the interval in which spot 24 of the first excitation light passes region 22b that is other than region 22a. The former intensity control is here assumed to be carried out.

Drive signal supply unit 11b includes correction signal generation unit 5b, laser power supply unit 6b, addition unit 8b, subtraction unit 9b, and amplifier 10b. Laser power supply unit 6b, addition unit 8b, subtraction unit 9b, and amplifier 10b are identical to laser power supply unit 6, addition unit 8, subtraction unit 9, and amplifier 10, respectively, that were described in the first example embodiment.

Correction signal generation unit 5b generates first correction signal S32 that cancels the change in intensity of the first fluorescent light that is produced by damage or gap 23 of a seam of phosphor layer 22 on the basis of detection signal S31 from optical detection unit 3a. For example, correction signal generation unit 5b generates first correction signal S32 by inversely amplifying detection signal S31 and then delaying the result by delay time t1 shown in FIG. 7.

Figure 8:
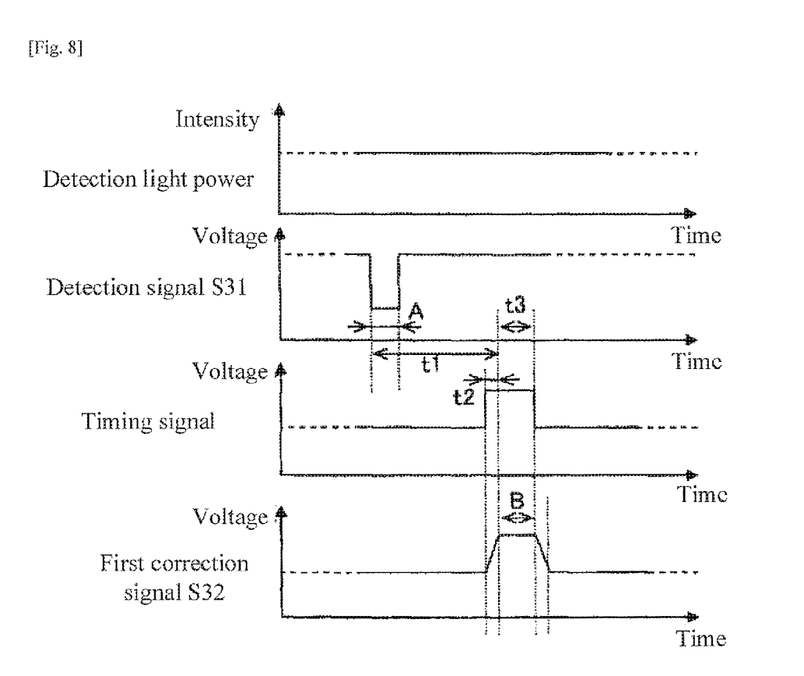
FIG. 8 is a waveform diagram for describing the operation of the drive signal supply unit of the light source device shown in FIG. 6.

FIG. 8 shows an example of the operation of generating first correction signal S32 that cancels the change in intensity of the first fluorescent light that is produced by gap 23. In the following explanation, the operation is described with reference to FIGS. 6 to 8.

Detection light generation unit 4a supplies detection light of fixed intensity. The detection light is irradiated upon the surface (wheel surface) on which phosphor layer 22 of wheel 21 is formed while wheel 21 is being rotated. The intensity of the reflected light from the wheel surface decreases in intervals in which spot 26 of the detection light passes over gap 23 of a seam of phosphor layer 22. As a result, the signal level of detection signal S31 from optical detection unit 3a decreases in interval A that corresponds to the interval in which spot 26 of the detection light passes over gap 23. This interval A is the reference of the interval of change in the intensity of the first excitation light.

Correction signal generation unit 5b first generates a timing signal in which detection signal S31 is inversely amplified. Taking as the reference a time that is later than the falling edge of detection signal S31 by time t1, the time of the rising edge of this timing signal is a time that precedes the reference by time t2 and the time of the falling edge of the timing signal is a time that follows the reference by time t3. Time t2 is equivalent to the response time of laser power supply unit 6b. Time t3 is equivalent to interval A.

Time t1 is equivalent to delay time t1 that was described in the first example embodiment and is determined by the positional relation between spot 24 of the first excitation light and spot 26 of the detection light (for example, the angle formed by the line that joins the center of spot 24 and the center of rotation and the line that joins the center of spot 26 and the center of rotation), the rotation rate, and the direction of rotation of wheel 21. In the case of a positional relation in which spot 26 of the detection light is positioned on the side opposite spot 24 of the first excitation light with the center of rotation interposed, the direction of rotation need not be considered.

Correction signal generation unit 5b next generates first correction signal S32 on the basis of the above-described timing signal. In first correction signal S32, the signal level gradually rises in a first interval that corresponds to time t2, is made a fixed level in a second interval that corresponds to time t3, following which the signal level gradually falls after a third interval. The second interval corresponds to the interval in which the first excitation light passes over region 23a that was shown in FIG. 7.

Laser power supply unit 6b supplies as output first drive signal S33 that accords with the magnitude of adjusted feedback signal S36 that was supplied by subtraction unit 9b.

Addition unit 8b superposes first correction signal S32 that was supplied by correction signal generation unit 5b upon first drive signal S33 that was supplied by laser power supply unit 6b. The signal that results from superposing first correction signal S32 upon first drive signal S33 is drive signal S37. Drive signal S37 is supplied to laser diode unit 7.

Laser diode unit 7 both drives a laser diode on the basis of drive signal S37 and supplies feedback signal S34 to drive signal supply unit 11b. Feedback signal S34 includes the change component that corresponds to first correction signal S32 that was superposed on first drive signal S33. Feedback signal S34 is supplied to one input of subtraction unit 9b.

Amplifier 10b adjusts the level of first correction signal S32 from correction signal generation unit 5b to become a predetermined level and supplies as output second correction signal S35 that is the signal that follows this adjustment. More specifically, amplifier 10b decreases the level of first correction signal S32 from correction signal generation unit 5b by an amount that corresponds to a known gain portion that is determined at the stage of generating feedback signal S34 of laser diode unit 7. Second correction signal S35 supplied as output by amplifier 10b is supplied to the other input of subtraction unit 9b. Second correction signal S35 is a signal that corresponds to the above-described change component that is contained in feedback signal S34.

Subtraction unit 9b subtracts second correction signal S35 that was supplied by amplifier 10b from feedback signal S34 that was supplied by laser diode unit 7, thereby eliminating the above-described change component that is contained in feedback signal S34. The signal from which the above-described change component has been eliminated is supplied to laser power supply unit 6b as adjusted feedback signal S36.

By means of the above-described operations, the change of intensity of the first fluorescent light that is produced by gap 23 of a seam of phosphor layer 22 can be decreased. Further, the change of intensity of the first fluorescent light that is produced by damage of phosphor layer 22 can also be decreased by the same operations.

The light source device of the present example embodiment exhibits the following action and effects.

When wheel 21 is being rotated and the first excitation light of a predetermined intensity is irradiated upon phosphor layer 22, the intensity of the first fluorescent light decreases in portions of damage or gap 23. The spot of the first excitation light is sufficiently greater than the width of gap 23 or damage, and change in the intensity of the first fluorescent light can be prevented if the intensity of the first excitation light is raised when the spot of the first excitation light passes over the portion of damage or gap 23.

When wheel 21 is caused to rotate and detection light of a predetermined intensity is irradiated upon phosphor layer 22, the intensity of the reflected light of the detection light also decreases at a portion of damage or gap 23. As shown in FIG. 7, the track of the spot of the detection light matches the track of the spot of the first excitation light, and the interval of passage of the spot of the first excitation light over a portion of damage or gap 23 can be specified on the basis of the change in intensity of the reflected light of the detection light.

On the basis of detection signal S31 that indicates the change in intensity of the reflected light of the detection light, correction signal generation unit 5b generates first correction signal S32 of a predetermined waveform that increases the intensity of the first excitation light in an interval in which the spot of the first excitation light passes over a portion of damage or gap 23. By causing laser diode unit 7 to operate by drive signal S37 realized by superposing this first correction signal S32 on first drive signal S33, the change in intensity of the first fluorescent light is canceled by the change in intensity of the first excitation light, with the result that the occurrence of flicker is prevented.

Further, as shown in FIG. 7, spot 26 of the detection light is formed at a position that is separated from spot 24 of the first excitation light, whereby optical detection unit 3a and detection light generation unit 4a do not block the first fluorescent light and do not cause interference with the optical system such as lenses that condense the first excitation light.

In addition, detection light such as infrared light is used in place of the second excitation light, whereby deterioration of the phosphor can be prevented compared to the first and second example embodiments.

In the light source device of the present example embodiment, correction signal generation unit 5b may continuously generate first correction signal S32 on the basis of detection signal S31 during operation of the light source device. Alternatively, for each predetermined interval or at any timing, correction signal generation unit 5b may generate a waveform pattern of first correction signal S32 of a single rotation (a one-cycle portion) of wheel 21 and then both hold this waveform pattern and supply first correction signal S32 that is based on the waveform pattern that is held.

Fourth Example Embodiment

Figure 9:
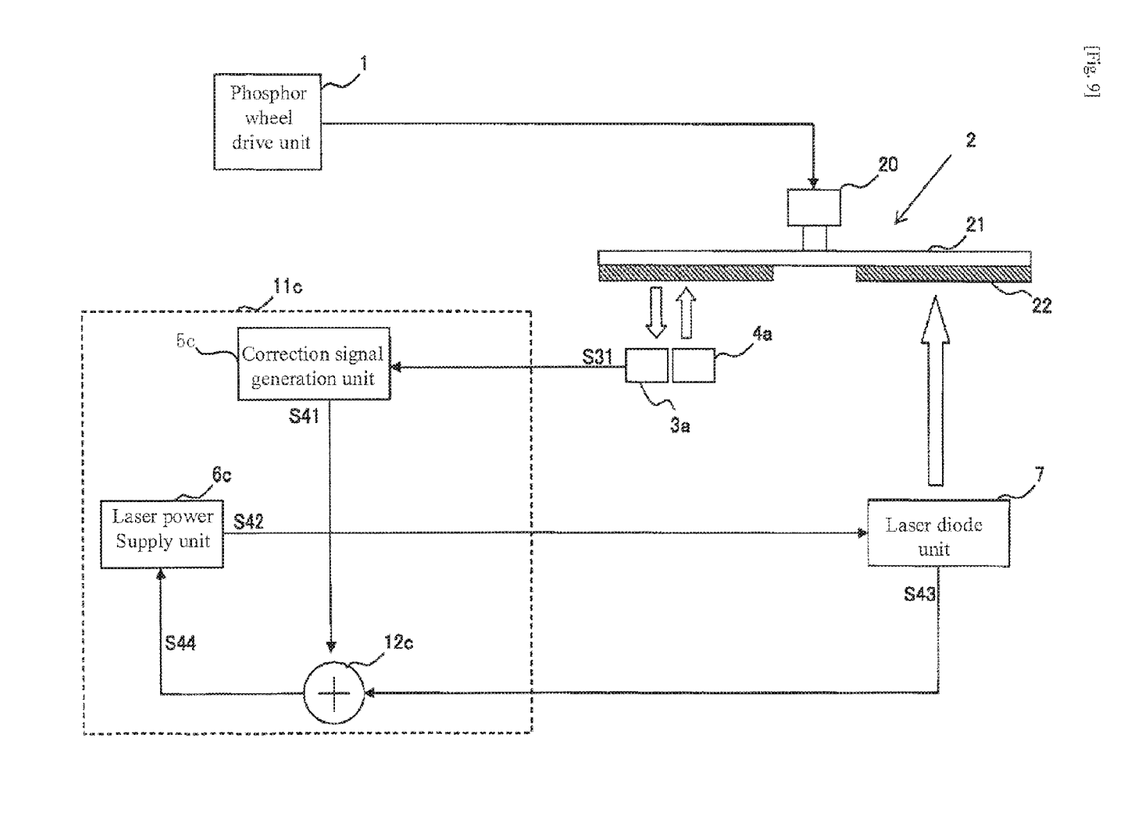
FIG. 9 is a block diagram showing the configuration of the light source device according to the fourth example embodiment of the present invention.

FIG. 9 is a block diagram showing the configuration of a light source device according to the fourth example embodiment of the present invention.

The light source device shown in FIG. 9 is of the same configuration as the light source device of the second or third example embodiment with the exception of the different configuration of drive signal supply unit 11c. To avoid redundant explanation, explanation of configuration that is identical to the light source device of the third example embodiment is here omitted.

Drive signal supply unit 11c is a control unit that changes the intensity of the first excitation light on the basis of detection signal S31 from optical detection unit 3a. Drive signal supply unit 11c changes the intensity of the first excitation light by changing the magnitude of the drive current of laser diode unit 7.

Drive signal supply unit 11c includes correction signal generation unit 5c, laser power supply unit 6c, and addition unit 12c. Laser power supply unit 6c and addition unit 12c are identical to laser power supply unit 6b and addition unit 12b, respectively, that were described in the second example embodiment.

Correction signal generation unit 5c differs from the third example embodiment and generates a timing signal realized by amplifying detection signal S31 from optical detection unit 3a. This timing signal is a signal realized by inverting the timing signal shown in FIG. 8. Taking as a reference a time that follows the time of the falling edge of detection signal S31 by time interval t1, the waveform falls at a time that precedes the reference by time interval t2 and rises at a time that follows the reference by time interval t3.

Correction signal generation unit 5c generates first correction signal S41 on the basis of the timing signal that is realized by amplifying detection signal S31. In first correction signal S41, the signal level gradually falls in a first interval that corresponds to time interval t2, the signal level is made a fixed level in a second interval that corresponds to time interval t3, and the signal level gradually rises after a third interval. The second interval corresponds to the interval in which the first excitation light passes over region 23a shown in FIG. 7. However, first correction signal S41 corresponds to a signal that is actually twice the feedback amount of the desired change of the laser diode current.

Addition unit 12c superposes first correction signal S41 that was supplied by correction signal generation unit 5c upon feedback signal S43 that was supplied by laser diode unit 7. Adjusted feedback signal S44 that is a superposed signal realized by superposing first correction signal S41 upon feedback signal S43 is supplied to laser power supply unit 6c.

Laser power supply unit 6c supplies drive signal S42 that accords with the magnitude of adjusted feedback signal S44 supplied by addition unit 12c to laser diode unit 7.

Laser diode unit 7 both drives the laser diode on the basis of drive signal S42 and supplies feedback signal S43 to drive signal supply unit 11. Feedback signal S43 contains a change component that corresponds to first correction signal S41. Addition unit 12 eliminates a portion of the change component by superposing first correction signal S41 upon feedback signal S43.

The present example y embodiment also exhibits the same action and effect as the third example embodiment.

The light source devices of each of the example embodiments described hereinabove are merely examples of the present invention, and the configuration and operation of these light source devices are open to appropriate modifications within a scope that will be clear to one of ordinary skill in the art.

For example, phosphor layer 22 that is formed on wheel 21 may also be formed in belt form that includes the circumference that is irradiated by the first excitation light.

For example, phosphor layer 22 that is formed on wheel 21 may be a yellow phosphor layer that contains phosphor that emits yellow fluorescent light.

Still further, phosphor layer 22 may be of a configuration that includes phosphor layers of a plurality of colors that each emit fluorescent light of a different color, and in which first excitation light and second excitation light (or detection light) are successively irradiated upon the phosphor layers of each color. In this case, the phosphor layers of each color may include a red phosphor layer that contains a phosphor that emits red fluorescent light, a green phosphor layer that contains a phosphor that emits green fluorescent light, and a blue phosphor layer that contains a blue phosphor that emits blue fluorescent light. Alternatively, a portion of phosphor layer 22 may also be made a reflecting body that reflects light or a transmission body that transmits light. In this case, the intensity of the first excitation light is controlled on the basis of the output timing and intensity of the detection light that accords with the phosphors of each color and the reflecting body or transmission body. The output timing of the detection light can be controlled by detecting the rotation timing of wheel 21. However, control is preferably implemented such that the first excitation light does not irradiate the border portion of the phosphor layer of each color. When this modification is applied to the third and fourth example embodiments, a correction signal of a predetermined waveform that accords with the fluorescent light characteristic is preferably generated to change the intensity of the first excitation light for each of the phosphor layers of each color.

Further, although the excitation light source that supplies the first excitation light and/or the second excitation light was here shown as a laser diode, a light source such as a light-emitting diode may also be used instead of a laser diode.

Projection-Type Display Device

A light source device of any of the above-described example embodiments can be generally applied to projection-type display devices (projectors).

A projection-type display device includes a light source device that was described in any of the first to fourth example embodiments, a display element that modulates light supplied from the light source device to form an image, and projection optical system that projects the image that was formed by the display element. The display element is, for example, a liquid crystal display device or a digital micromirror device (DMD).

Finally, the present invention can take forms such as shown in the following Supplementary Notes 1-14 but is not limited to these forms.

[Supplementary Note 1]

A light source device comprises:

a phosphor rotating body on which a phosphor formed on a surface and that is used in a state of rotation having an axis of rotation that is perpendicular to the surface;

a first excitation light source that irradiates first excitation light upon a first position that is separated by a predetermined distance from the center of rotation on the surface to cause emission of a first fluorescent light;

a detection light generation unit that irradiates detection light upon a second position that differs from the first position and that is separated by the predetermined distance from the center of rotation on the surface;

an optical detection unit that supplies a detection signal that corresponds to emission light that is emitted from the phosphor rotating body in response to the detection light; and a control unit that receives the detection signal and that controls the intensity of the first excitation light on the basis of the detection signal.

[Supplementary Note 2]

In the light source device as described in Supplementary Note 1:

the control unit controls the intensity of the first excitation light after the passage of a predetermined time interval from the reception of the detection signal; and the predetermined time interval is determined by the positional relation on the surface of each of the first excitation light and the detection light on the surface of the phosphor rotating body and the rotation rate of the phosphor rotating body.

[Supplementary Note 3]

In the light source device as described in Supplementary Note 1 or 2, the emission light is second fluorescent light that is excited by the detection light or reflected light that is the detection light reflected by the phosphor rotating body.

[Supplementary Note 4]

In the light source device as described in any one of Supplementary Notes 1 to 3:

the detection signal is a signal that indicates the intensity of the emission light; and the control unit causes change of the intensity of the first excitation light such that change of the intensity of the first fluorescent light is reduced.

[Supplementary Note 5]

In the light source device as described in any one of Supplementary Notes 1 to 4, the intensity of the detection light is lower than the intensity of the first excitation light.

[Supplementary Note 6]

In the light source device as described in any one of Supplementary Notes 1 to 5:

the first excitation light source is a laser diode or a light-emitting diode; and the control unit controls the drive current of the first excitation light source.

[Supplementary Note 7]

In the light source device as described in any one of Supplementary Notes 1 to 6:

the first excitation light source supplies the first excitation light that has an intensity that accords with the drive current; and the control unit causes change of the intensity of the first excitation light by changing the drive current.

[Supplementary Note 8]

In the light source device described in Supplementary Note 7, the control unit generates a correction signal that accords with change in intensity of the second fluorescent light on the basis of the detection signal and causes change of the drive current on the basis of the correction signal.

[Supplementary Note 9]

In the light source device as described in Supplementary Note 8:

the first excitation light source supplies a first feedback signal that accords with the intensity of the first excitation light to the control unit; and the control unit comprises:

a correction signal generation unit that generates a first correction signal realized by inversely amplifying the detection signal and then delaying the result by a predetermined time interval;

an amplifier that adjusts the level of the first correction signal that was generated by the correction signal generation unit to a predetermined level and supplies a second correction signal that is the signal that follows adjustment;

a subtraction unit that supplies a second feedback signal realized by subtracting the second correction signal that was supplied by the amplifier from the first feedback signal;

a power source unit that supplies a first drive signal that accords with the magnitude of the second feedback signal that was supplied by the subtraction unit; and an addition unit that superposes the first correction signal that was generated by the correction signal generation unit upon the first drive signal that was supplied by the power source unit and supplies the superposed signal as the drive signal.

[Supplementary Note 10]

In the light source device as described in Supplementary Note 8, the first excitation light source supplies a first feedback signal that accords with the intensity of the first excitation light to the control unit; and the control unit comprises:

a correction signal generation unit that generates a first correction signal that is realized by amplifying the detection signal and then delaying the result by a predetermined time interval;

an addition unit that supplies a second feedback signal realized by superposing the first correction signal that was generated by the correction signal generation unit upon the first feedback signal; and a power source unit that generates a first drive signal that accords with the magnitude of the second feedback signal that was supplied by the addition unit and that supplies the first drive signal as the drive signal.

[Supplementary Note 11]

In the light source device as described in any one of Supplementary Notes 1 to 10, the spot of the second excitation light on the surface of the phosphor rotating body is formed on the side opposite the spot of the first excitation light with the center of rotation interposed.

[Supplementary Note 12]

In the light source device as described in any one of Supplementary Notes 1 to 11, the phosphor includes two or more phosphor regions that supply fluorescent light of different wavelengths.

[Supplementary Note 13]

A projection-type display device comprises:

a light source device as described in any one of Supplementary Notes 1 to 12;

a display element that modulates light that is supplied from the light source device to form an image; and a projection optical system that projects the image that was formed by the display element.

[Supplementary Note 14]

A light source control method includes:

causing a phosphor rotating body on which a phosphor is formed on a surface to rotate;

causing excitation light to irradiate a first position that is separated by a predetermined distance from the axis of rotation on the surface to cause emission of fluorescent light;

irradiating detection light upon a second position that differs from the first position and that is separated by the predetermined distance from the axis of rotation on the surface and detecting emission light that is emitted from the phosphor rotating body in response to the detection light; and controlling the intensity of the excitation light on the basis of the detection result of the emission light.

EXPLANATION OF REFERENCE NUMBERS 1 phosphor wheel drive unit
2 phosphor wheel unit
3 optical detection unit
4 detection light generation unit
5 correction signal generation unit
6 laser power supply unit
7 laser diode unit
8 addition unit
9 subtraction unit
10 amplifier
11 drive signal supply unit

What is claimed is:

1. A light source device comprising:
   a phosphor rotating body on which a phosphor formed on a surface and that is used in a state of rotation having an axis of rotation that is perpendicular to said surface;
   a first excitation light source that irradiates first excitation light upon a first position that is separated by a predetermined distance from the center of rotation on said surface to cause emission of a first fluorescent light;
   a detection light generation unit that irradiates detection light upon a second position that differs from said first position and that is separated by said predetermined distance from said center of rotation on said surface;
   an optical detection unit that supplies a detection signal that corresponds to emission light that is emitted from said phosphor rotating body in response to said detection light; and
   a control unit that receives said detection signal and that controls the intensity of said first excitation light on the basis of the detection signal.

2. The light source device as set forth in claim 1, wherein:
   said control unit controls the intensity of said first excitation light after the passage of a predetermined time interval from the reception of said detection signal; and
   said predetermined time interval is determined by the positional relation on said surface of each of said first excitation light and said detection light on the surface of said phosphor rotating body and the rotation rate of said phosphor rotating body.

3. The light source device as set forth in claim 1, wherein said emission light comprises second fluorescent light that is excited by said detection light or reflected light that is said detection light reflected by said phosphor rotating body.

4. The light source device as set forth in claim 1, wherein:
   said detection signal comprises a signal that indicates the intensity of said emission light; and
   said control unit causes change of the intensity of said first excitation light such that change of the intensity of said first fluorescent light is reduced.

5. The light source device as set forth in claim 1, wherein the intensity of said detection light is lower than the intensity of said first excitation light.

6. The light source device as set forth in claim 1, wherein:
   said first excitation light source comprises a laser diode or a light-emitting diode; and
   said control unit controls the drive current of said first excitation light source.

7. The light source device as set forth in claim 1, wherein:
   said first excitation light source supplies said first excitation light that has an intensity that accords with the drive current; and
   said control unit causes change of the intensity of said first excitation light by changing said drive current.

8. The light source device as set forth in claim 7, wherein said control unit generates a correction signal that accords with change in intensity of said second fluorescent light on the basis of said detection signal and causes change of said drive current on the basis of said correction signal.

9. The light source device as set forth in claim 8, wherein:
   said first excitation light source supplies a first feedback signal that accords with the intensity of said first excitation light to said control unit; and
   said control unit comprises:
   a correction signal generation unit that generates a first correction signal realized by inversely amplifying said detection signal and then delaying the result by a predetermined time interval;
an amplifier that adjusts the level of said first correction signal that was generated by said correction signal generation unit to a predetermined level and then supplies a second correction signal that is the signal that follows adjustment;
a subtraction unit that supplies a second feedback signal realized by subtracting said second correction signal that was supplied by said amplifier from said first feedback signal;
a power source unit that supplies a first drive signal that accords with the magnitude of said second feedback signal that was supplied by said subtraction unit; and
an addition unit that superposes said first correction signal that was generated by said correction signal generation unit upon said first drive signal that was supplied by said power source unit and supplies the superposed signal as said drive signal.

10. The light source device as set forth in claim 8, wherein:
said first excitation light source supplies a first feedback signal that accords with the intensity of said first excitation light to the control unit; and
said control unit comprises:
a correction signal generation unit that generates a first correction signal that is realized by amplifying said detection signal and then delaying the result by a predetermined time interval;
an addition unit that supplies a second feedback signal realized by superposing said first correction signal that was generated by said correction signal generation unit upon said first feedback signal; and
a power source unit that generates a first drive signal that accords with the magnitude of said second feedback signal that was supplied by said addition unit and that supplies the first drive signal as said drive signal.

11. The light source device as set forth in claim 1, wherein:
the spot of said second excitation light on the surface of said phosphor rotating body is formed on the side opposite the spot of said first excitation light with said center of rotation interposed.

12. The light source device as set forth in claim 1, wherein said phosphor includes two or more phosphor regions that supply fluorescent light of different wavelengths.

13. A projection-type display device comprising:
the light source device as set forth in claim 1;
a display element that modulates light that is supplied from said light source device to form an image; and
a projection optical system that projects the image that was formed by said display element.

14. A light source control method comprising:
causing a phosphor rotating body on which a phosphor is formed on a surface to rotate;
causing excitation light to irradiate a first position that is separated by a predetermined distance from the center of rotation on said surface to cause emission of fluorescent light;
irradiating detection light upon a second position that differs from said first position and that is separated by said predetermined distance from said center of rotation on said surface and detecting emission light that is emitted from said phosphor rotating body in response to said detection light; and
controlling the intensity of said excitation light on the basis of the detection result of said emission light.

* * * * *